Patented Jan. 30, 1923.

1,443,697

UNITED STATES PATENT OFFICE.

ROBIN BRUCE CROAD, OF LIVERPOOL, ENGLAND.

MANUFACTURE AND PRODUCTION OF TANNING AGENTS.

No Drawing.  Application filed March 24, 1922. Serial No. 546,509.

*To all whom it may concern:*

Be it known that I, ROBIN BRUCE CROAD, a subject of the King of Great Britain and Ireland, residing at Bull Lane, Aintree, Liverpool, in the county of Lancaster, England, have invented new and useful Improvements in and in the Manufacture and Production of Tanning Agents, of which the following is a specification.

This invention relates to improvements in, and in the manufacture and production of, tanning agents and it has for its object the production of improved tanning agents having filling properties and less astringent action and without any reduction of the speed of tanning for the production of different kinds of leather.

I attain this end by a process of double condensation and this is effected by condensing formaldehyde, its polymerization products and compounds which give rise to formaldehyde with aromatic compounds containing one or more hydroxyl groups, an alkaline condensing agent being employed, the product thus obtained is then sulfonated the resultant product being further condensed with one or more aromatic compounds containing one or more sulfonic acid groups alone or in combination with hydroxyl and halogen groups, by means of an aldehydic body. the soluble product being partly neutralized.

For the production of tanning agents in accordance with the present invention at least two molecules of an aromatic compound containing at least one hydroxyl group, are condensed with one molecule of formaldehyde, using as a condensing agent an oxide or hydroxide or carbonate or bi-carbonate of an alkaline metal or alkaline earth metal, ammonia or a salt of a strong base with a weak acid such as sodium acetate the resulting product being sulfonated with one or two molecules of a sulfonating agent, the product thus obtained being condensed either with a further molecule of an aromatic compound containing one or more sulfonic acid groups alone or in combination with hydroxyl and halogen groups, or with a further molecule of the sulfonated resin itself by means of an aldehydic body such as formaldehyde its polymerization products and compounds which give rise to formaldehyde, acetaldehyde, paracetaldehyde, compounds of acetaldehyde giving rise to acetaldehyde, trithioacetaldehyde, (alpha and beta polymers), aldol and crotonaldehyde and their polymerization products, and the resultant product partly neutralized. In this second condensation no condensation agent is used.

The condensation products employed are as a rule too strongly acid to be used without neutralization of any free mineral acid where present, and also without partial neutralization of the sulfonic acid group or groups. In general the finished product should have an acidity so that 1 gramme of the product requires 1.0 to 1.4 cc. normal sodium hydroxide for complete neutralization.

For partially neutralizing condensation products thus produced I prefer to use oxides, hydroxides and carbonates of alkali and alkaline earth metals, ammonium hydroxide and ammonium carbonate. The tanning properties vary according to the base used for neutralization.

The following examples will serve to illustrate further the nature of this invention, which however, is not confined to these examples.

*Examples.*

1. 216 grammes mixed cresols (cresylic acid) are mixed with 75 cc. 40% formaldehyde and 0.5–1.0 cc. of 0.88 ammonia solution are added. The mixture is heated at 100°–120° C., being stirred constantly till a resin free from water is obtained. The resin is sulfonated with 98% sulfuric acid, and 188 grammes of crude cresolsulfonic acids are added. 37.5–75 cc. 40% formaldehyde are added gradually and with constant stirring. The product is diluted with water and neutralized with caustic soda until 10 grammes of the product require 11–12 cc. normal caustic soda solution to be completely neutralized and having a specific gravity of between 50–70° Tw.

2. 216 gr. mixed cresols (cresylic acid) are mixed with 75 cc. 40% formaldehyde and 0.5–1.0 cc. of 0.88 ammonia solution are added. The mixture is heated at 100°–120° C. in an autoclave for ½–1 hour, the resin so formed is dried and then sulfonated with 98% sulfuric acid, 188 gr. of crude cresol-sulfonic acids are added and 37.5–75 cc. 40% formaldehyde added gradually and with constant stirring. The product is diluted with water and neutralized with ammonia until 10 gr. of the product require 10–12 cc. normal caustic soda solution to be completely neutralized and having a specific gravity of between 50°–70° Tw.

3. 300–400 gr. of the soluble sulfonated resin, obtained in the primary condensation as described in example 1 or 2 are mixed with 188 gr. crude cresol sulfonic acids and 22–44 gr. paracetaldehyde are run in gradually and with constant stirring, the soluble product is diluted and partly neutralized with milk of lime, so that 10 gr. of the product require 10–12 cc. normal caustic soda to be completely neutralized and having after freeing from calcium sulfate a specific gravity of between 50°–70° Tw.

4. 300–400 gr. of the soluble sulfonated resin obtained in the primary condensation as described in example 1 or 2, are mixed with 260 gr. crude alpha or beta-naphthalene sulfonic acid and 37.5–75 cc. 40% formaldehyde added gradually with constant stirring. Dilute the soluble product so obtained and partly neutralize with milk of lime so that 10 gr. of the product require 10–12 cc. normal caustic soda solution to be completely neutralized. Filter free from calcium sulfate and bring to specific gravity of 50°–70° Tw.

5. 432 grammes mixed cresols (cresylic acid) are mixed with 100 cc. of 40% formaldehyde and 0.5–1.0 gr. of 0.88 ammonia solution are added. The mixture is heated at 100°–120° C. in an autoclave for ½–1 hour. The resin so formed is dried and then sulfonated with 98% sulfuric acid, 40–50 cc. 40% formaldehyde are then added gradually and with constant stirring, the product diluted with water and partly neutralized with zinc oxide until 10 gr. of the product require 10–12 cc. normal caustic soda solution to be completely neutralized and having a specific gravity of between 50°–70° Tw.

The amount of cresol employed in the foregoing example is in excess of that required for the first condensation, this is subsequently sulfonated together with the resin and is finally condensed with the added formaldehyde.

6. 300–400 grs. of the soluble sulfonated resin obtained in the primary condensation as described in example 1 or 2, are mixed with 37.5–75 cc. 40% formaldehyde gradually and with constant stirring. Dilute with water and partly neutralize by adding magnesium oxide till 10 gr. of the product require 10–12 cc. normal caustic soda solution to be completely neutralized and has a specific gravity of from 50°–70° Tw.

7. 300–400 gr. of the soluble sulfonated resin obtained in the primary condensation as described in examples one or two are mixed with 188 gr. crude cresol sulfonic acids and 30–60 gr. trithioacetaldehyde are added gradually with constant stirring. The soluble product is diluted and partly neutralized with caustic soda so that 10 gr. of the product requires 10–12 cc. normal caustic soda to be completely neutralized and having a specific gravity of from 50° to 70° Tw.

8. 300–400 gr. of the soluble sulfonated resin obtained in the primary condensation as described in example 1 or 2 are mixed with 35.5–70 gr. crotonaldehyde gradually and with constant stirring. Dilute with water and partly neutralize by adding magnesium oxide till 10 gr. of the product require 10–12 cc. normal caustic soda solution to be completely neutralized and has a specific gravity of from 50°–70° Tw.

In the above examples where cresols are mentioned commercial cresol, technically known as cresylic acid, is meant, or where cresol sulfonic acids are referred to, the sulfonic acid obtained by the action of the sulfuric acid on cresylic acid is meant.

What we claim is:—

1. The process of producing soluble products suitable for use as tanning agents which consists in first producing a resinous and insoluble compound by condensing at a suitable pressure at least two molecules of an aromatic hydroxy body with one molecule of formaldehyde using an alkaline reacting substance as a condensing agent, subsequently sulfonating with at least one molecule of a sulfonating agent, subjecting the product thereby obtained to further condensation with a sulfonated aromatic compound and an aldehydic body in the proportion of at least 0.5 of a molecule of an aldehydic body for every 1 molecule of sulfonated aromatic body added and subsequently partially neutralizing.

2. The process of producing soluble products suitable for use as tanning agents which consists in first producing a resinous and insoluble compound by condensing at a suitable pressure at least two molecules of an aromatic hydroxy body with one molecure of a compound giving rise to formaldehyde using an alkaline reacting substance as a condensing agent, subsequently sulfonating with at least one molecule of a sulfonating agent, subjecting the product thereby obtained to further condensation with a sulfonated aromatic compound and an aldehydic body in the proportion of at least .5 of a molecule of an aldehydic body for every 1 molecule of sulfonated aromatic body added subsequently partially neutralizing.

3. The process of producing soluble products suitable for use as tanning agents which consists in first producing a resinous or insoluble compound by condensing at a suitable pressure at least two molecules of an aromatic hydroxy body with one molecule of formaldehyde using an alkaline reacting substance as a condensing agent, subsequently sulfonating with at least one molecule of a sulfonating agent, condensing two molecules of the soluble sulfonated resinous product thus obtained with each other by means of an aldehydic body in the proportion of at least .5 of a molecule of an aldehydic body for every 1 molecule of sulfonated aromatic body added and subsequently partially neutralizing.

4. The process of producing soluble products suitable for use as tanning agents which consist in first producing a resinous or insoluble compound by condensing at a suitable pressure at least two molecules of an aromatic hydroxy body with one molecule of a compound giving rise to formaldehyde using an alkaline reacting substance as a condensing agent, subsequently sulfonating with at least one molecule of a sulfonating agent, condensing two molecules of the soluble sulfonated resinous product thus obtained with each other by means of an aldehydic body in the proportion of at least .5 of a molecule of an aldehydic body for every 1 molecule of sulfonated aromatic body added subsequently and partially neutralizing.

5. The process of producing soluble products suitable for use as tanning agents which consists in first producing a resinous and insoluble compound by condensing at least two molecules of mixed cresols with one molecule of formaldehyde using an alkaline reacting substance as a condensing agent, heating the mixture to produce a water-free resin, subsequently sulfonating with at least one molecule of sulfuric acid, subjecting the product thereby obtained to further condensation with one molecule of a sulfonated aromatic body and .5 of a molecule of aldehydic body and subsequently diluting with water and partially neutralizing.

6. The process of producing soluble products suitable for use as tanning agents which consists in first producing a resinous and insoluble compound by condensing at least three molecules of mixed cresols with one molecule of formaldehyde using an alkaline reacting substance as a condensing agent, drying the resin thus formed subsequently sulfonating with at least one molecule of sulfuric acid subjecting the product thereby obtained to further condensation with .5 of a molecule of aldehydic body and subsequently diluting with water and partially neutralizing.

7. As new articles of manufacture condensation products of an aromatic body with formaldehyde and an alkaline reacting substance subsequently treated with a sulfonating agent and further condensed with a sulfonated aromatic compound and an aldehydic body which products when partly neutralized are highly viscous organic compounds containing at least one sulfonic acid group, are easily soluble in water and which tan hides.

8. As new articles of manufacture condensation products of an aromatic body with formaldehyde and an alkaline reacting substance subsequently treated with a sulfonating agent and further condensed with an equal quantity of the sulfonated body thereby produced and an aldehydic body which products when partially neutralized are highly viscous organic compounds containing at least one sulfonic acid group, are easily soluble in water and which tan hides.

ROBIN BRUCE CROAD.